United States Patent

Gutz et al.

(10) Patent No.: US 8,196,091 B2
(45) Date of Patent: ***Jun. 5, 2012

(54) COMPUTER METHOD AND APPARATUS FOR IMPROVING PROGRAMMING MODELING WITH LIGHTWEIGHT STEREOTYPES

(75) Inventors: Steve John Gutz, Gloucester (CA); Kenneth Earle Hussey, Kanata (CA); Daniel Donat Leroux, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 884 days.

This patent is subject to a terminal disclaimer.

(21) Appl. No.: 12/212,145

(22) Filed: Sep. 17, 2008

(65) Prior Publication Data

US 2009/0007059 A1    Jan. 1, 2009

Related U.S. Application Data

(63) Continuation of application No. 11/001,649, filed on Dec. 1, 2004, now Pat. No. 7,478,362.

(51) Int. Cl.
  *G06F 9/44* (2006.01)
(52) U.S. Cl. ............... 717/104; 717/108; 717/116
(58) Field of Classification Search .............. None
  See application file for complete search history.

(56) References Cited

U.S. PATENT DOCUMENTS

| | | | |
|---|---|---|---|
| 6,269,473 B1 * | 7/2001 | Freed et al. ............... 717/104 |
| 6,356,955 B1 | 3/2002 | Hollberg et al. | |
| 6,611,955 B1 | 8/2003 | Logean et al. | |
| 7,000,219 B2 * | 2/2006 | Barrett et al. ............... 717/107 |
| 7,039,908 B2 | 5/2006 | Steensgaard | |
| 7,069,537 B2 | 6/2006 | Lazarov | |
| 7,188,016 B2 * | 3/2007 | Flores et al. ............... 701/59 |
| 7,219,328 B2 | 5/2007 | Schloegel et al. | |
| 7,293,254 B2 | 11/2007 | Bloesch et al. | |
| 7,373,596 B2 * | 5/2008 | Hu et al. ............... 715/239 |
| 7,424,701 B2 * | 9/2008 | Kendall et al. ............... 717/105 |
| 7,509,629 B2 * | 3/2009 | Sakamoto et al. ............... 717/105 |
| 7,673,283 B2 * | 3/2010 | Gutz et al. ............... 717/104 |
| 7,827,524 B2 * | 11/2010 | Wilson et al. ............... 717/108 |
| 7,861,214 B2 * | 12/2010 | Amsden et al. ............... 717/104 |
| 7,861,218 B2 * | 12/2010 | Hussey ............... 717/108 |

(Continued)

FOREIGN PATENT DOCUMENTS

JP    2001075817    3/2001

OTHER PUBLICATIONS

David N. Chin, Acquiring user models, published by Kluwer Academic Publisher, 1993, pp. 185-197.*

(Continued)

*Primary Examiner* — Tuan Dam
*Assistant Examiner* — Zheng Wei
(74) *Attorney, Agent, or Firm* — Hamilton, Brook, Smith & Reynolds, P.C.

(57) ABSTRACT

Computer method and apparatus provides lightweight stereotypes in a programming model. An alternative to applied profiles is disclosed. A keyword list or list of strings is recorded as an annotation to a model element. The keywords are indicative of applied stereotypes of the model element, where the stereotypes are empty or are used as labels. The list of strings effectively augments the collection of applied stereotypes of the model element.

20 Claims, 5 Drawing Sheets

U.S. PATENT DOCUMENTS

| | | | |
|---|---|---|---|
| 2001/0017632 A1* | 8/2001 | Goren-Bar | 345/744 |
| 2002/0104068 A1 | 8/2002 | Barrett et al. | |
| 2002/0147763 A1 | 10/2002 | Lee et al. | |
| 2003/0074648 A1* | 4/2003 | Brassard et al. | 717/104 |
| 2004/0216085 A1* | 10/2004 | Wilson et al. | 717/108 |
| 2005/0066338 A1* | 3/2005 | Bloesch et al. | 719/328 |
| 2005/0071805 A1 | 3/2005 | Lauterbach et al. | |
| 2005/0160401 A1 | 7/2005 | Russo et al. | |
| 2005/0188353 A1 | 8/2005 | Hasson et al. | |
| 2005/0261923 A1 | 11/2005 | Brown et al. | |
| 2005/0268281 A1 | 12/2005 | Letkeman et al. | |
| 2006/0064667 A1 | 3/2006 | de Freitas | |
| 2006/0101376 A1 | 5/2006 | Gutz et al. | |
| 2008/0295068 A1* | 11/2008 | Kendall et al. | 717/104 |
| 2011/0010686 A1* | 1/2011 | Wilson et al. | 717/104 |

OTHER PUBLICATIONS

Berner et al., A Classification of Stereotypes for Object-Oriented Modleing Languages, published 1999, pp. 249-264.*

OMG Unified Modeling Language Specification Version 1.4, published in Sep. 2001, pp. 1-566.*

Budinsky, et al., "Eclipse Modeling Framework: A Developer's Guide," sections 5.7, 13.6; *Addison Wesley Professional* (Aug. 11, 2003), 8 pages.

Robak, S. et al., "Extending the UML for Modelling Variability for System Families," *Int'l. J. Appl. Math. Comput. Sci.*, 12(2):285-298 (2002).

Szostak, S. et al., "UML Extensions for Modeling Real-Time and Embedded Systems," International Workshop on Discrete-event System Design, DESDes '01, Jun. 27-29, 2001,Przytok, Poland (6 pp.).

D'Souza, D. et al., "First Class Extensibility for UML—Packaging of Profiles, Stereotypes, Patterns," In UML '99, The Unified Modeling Language—Beyond the Standard, Second International Conference, Fort Collins, Colorado, Oct. 28-30, 1999, pp. 265-277.

Perez-Martinez, J.E., "Heavyweight extensions to the UML metamodel to describe the C3 architectural style," *ACM SIGSOFT Software Engineering Notes 28*(3), ACM Press, May 2003 (6 pp.).

Selonen, P. and J. Xu, "Validating UML Models Against Architectural Profiles," Proceedings of 9th European Software Engineering Conference/11th ACM SIGSOFT International Symposium on Foundations of Software Engineering '03, Sep. 1-5, 2003, Helsinki (ACM SIGSOFT Software Engineering Notes 28:5(58-67).

de Miguel, M. et al., "UML Extensions for the Specification and Evaluation of Latency Constraints in Architectural Models," Proceedings of the Second International Workshop on Software and Performance (ACM Press) 2000, Ottawa, Ontario, Canada (pp. 83-88).

Cortellessa, V. and A. Pompei, "Towards a UML profile for QoS: a contribution in the reliability domain," Proceedings of the Fourth International Workshop on Software and Performance, Jan. 14-16, 2004, Redwood Shores, California (ACM SIGSOFT Software Engineering Notes 29(1):197-206).

OMG Document, "UML 2.0 Infrastructure Specification," Sep. 2003, Object Management Group, Inc., pp. 1-187.

Budinsky, F. et al., "Dynamic EMF," In *Eclipse Modeling Framework—A Developer's Guide*, Addison-Wesley, Ch. 2, pp. 34-35 (Aug. 2003).

Alhir, Sinan Si, "Extending the Unified Modeling Language (UML)," retrieved from: http://citeseer.ist.psu.edu/alhir99extending.html (Jan. 3, 1999).

Gogolla, Martin, et al., "Analysis of UML Stereotypes within the UML Metamodel," *UML 2002, LNCS 2460*, pp. 84-99 (2002).

Merks, E., "The Eclipse Modeling Framework Introducing Modeling to Java Technology Mainstream," Javaone Sun's 2004 Worldwide Java Developer Conference, Jun. 2004, slides 1-37.

Unified Modeling Language: Superstructure, Version 2.0, Final Adopted Specification, Date: Aug. 2003, pp. 569-584.

* cited by examiner

COMPUTER METHOD AND APPARATUS FOR IMPROVING PROGRAMMING MODELING WITH LIGHTWEIGHT STEREOTYPES

CROSS REFERENCE TO RELATED APPLICATION

This application is a continuation of U.S. application Ser. No. 11/001,649, filed Dec. 1, 2004 (now U.S. Pat. No. 7,478, 362). The entire teachings of the above application(s) are incorporated herein by reference.

BACKGROUND

With the proliferation of software products and services, attempts have been made to codify and/or standardize the designing of software and software architecture. Examples include:

The Booch Method and Modeling Language (see "Object Oriented Analysis and Design" by Grady Booch);

James Rumbaugh and Associates' Object Modeling Technique (OMT);

the Object Oriented Software Engineering (OOSE) method by Ivar Jacobson; and the Unified Modeling Language (UML) which combines the foregoing and industry best practices.

The UML is a visual modeling language (with formal syntax and semantics) for communicating a model or conceptionalization. Thus the modeling language specification specifies modeling elements, notation and usage guidelines and not order of activities, specification of artifacts, repository interface, storage, run-time behavior and so forth. In general, at the modeling level a "problem" is posed in terms of a customer's needs and requirements and may be referred to as the business problem system. The software designer develops a "solution" software product and or service that addresses the problem. The UML syntax enables software designers to express (specify and document) the subject problems and solutions in a standardized manner, while the UML semantics enable knowledge about the subject system to be captured and leveraged during the problem solving phase. See "UML in a Nutshell" by Simon Si Alhir, published by O'Reilly & Associates, September 1998. As such, the UML enables the sharing of information (including prior solution portions) and extension (without reimplementation) of core object oriented concepts (analysis and design) during the iterative problem-solving process for designing software products.

The UML2 specification defines stereotypes contained within a profile and applied to a model as a method of providing lightweight metaclass extensions. This enables the use of domain-specific terminology and notation for a given extended metaclass. As defined in the specification, a stereotype must be owned by a profile which is applied to a model through a ProfileApplication instance added to the model's appliedProfiles collection.

Though applied stereotypes are intended to be lightweight extensions when compared to alternative methods in UML, they actually impose substantial overhead in both memory and run-time processing. In cases where the stereotype is used as a simple domain-specific label (i.e. it contains no owned properties), the overhead of stereotypes stands out.

BRIEF SUMMARY

The present invention addresses and/or overcomes the above problems of the prior art. In particular, the present invention provides an alternative to applied profiles and a given modeling tool's mechanism for determining which stereotypes are applied to a given element.

In a preferred embodiment, a computer method and apparatus provides lightweight stereotypes (i.e., stereotypes that are used as labels or are empty) in a programming model. The invention method includes the steps of:

given a model element having a collection of applied stereotypes, storing keywords indicative of the applied stereotypes; and interpreting the stored keywords and generating therefrom a model that implements the applied stereotypes.

The step of storing keywords preferably stores a keyword list or list of strings as an annotation to the model element.

BRIEF DESCRIPTION OF THE SEVERAL VIEWS OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A description of preferred embodiments of the invention follows.

Figure 1:
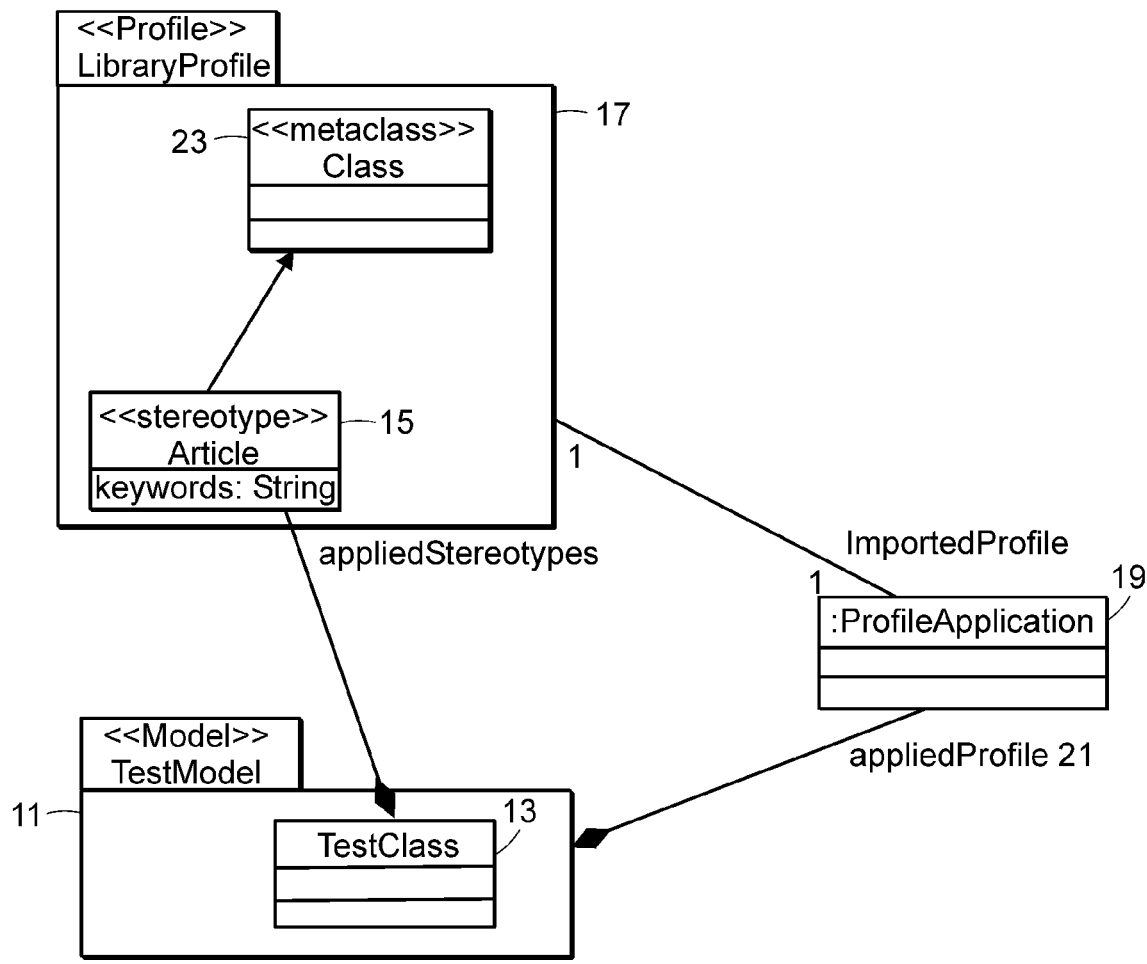
FIG. 1 is a schematic illustration of stereotypes applied to an element within a model in the prior art.

FIG. 1 illustrates how stereotypes 15 are applied to an element 13 within a model 11 according to the UML 2 specification. The model "TestModel" 11 has an element "TestClass" 13. A metaclass extension 23 for TestClass element 13 is provided by stereotype "Article" 15. A profile "Library Profile" 17 owns the stereotype "Article" 15 and is applied to TestModel 11 through ProfileApplication instance 19. ProfileApplication instance 19 is added to model's 11 appliedProfiles collection as indicated at 21.

In many cases, a stereotype 15 is used as a domain-specific label and it is in these situations that the amount of memory and processing load can be significantly reduced using techniques which require neither the creation of a profile 17 nor the overhead of references to ProfileApplication instances 19 in the model 11.

For situations where the stereotype is used for simple labeling, the present invention introduces a concept of a collection of keyword strings to be used instead of the traditional stereotypes 15. The keyword list can be implemented using any standard container class provided by the host language. For example in Java an ArrayList object may be used. This list is attached to a selected element 13 within the model 11 to provide a set of keywords. There is no requirement to create a relatively "heavy" construct like a stereotype 15 and no need to reference UML profiles 17 through a ProfileApplication instance 19. The memory savings for even small models is notable.

Figure 2:
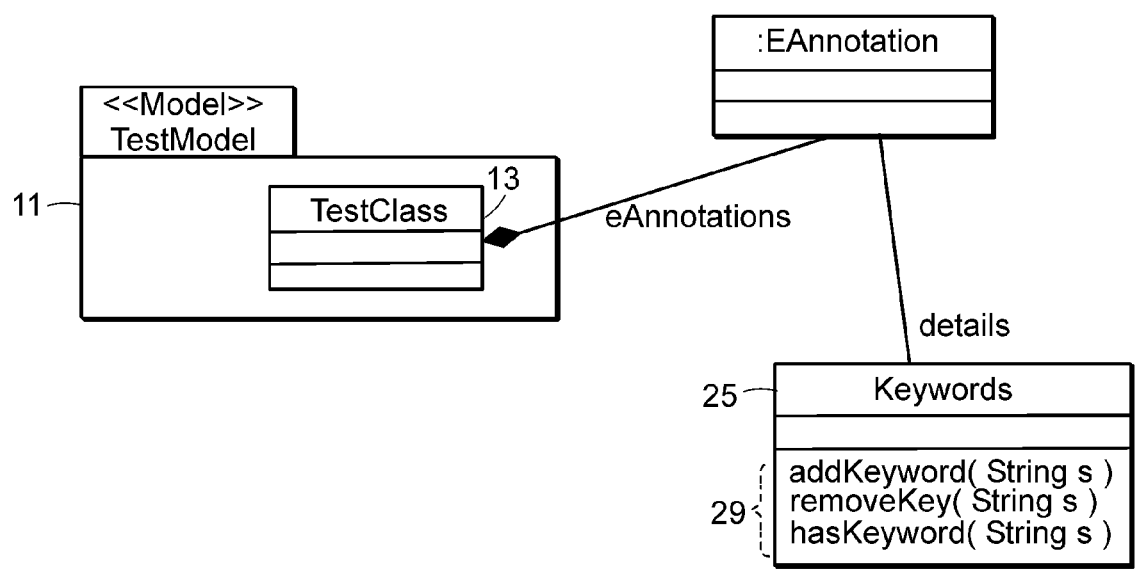
FIGS. 2 and 3 are block diagrams of a preferred embodiment of the present invention.

FIG. 2 is illustrative in part. A model 11 has element TestClass 13. A keyword list 25 is attached to element 13 as an eAnnotation 27 and provides a set of keywords (corresponding to desired stereotype labels).

Keywords must mimic some of the basic concepts of stereotypes 15—for example they may be applied or removed from a given model element 13. When using a programming language such as Java, one choice for implementing the invention keyword concept is a standard list containing strings representing the domain-specific labels.

Most meta-modeling languages provide a mechanism to attach arbitrary data to a model element 13. Eclipse Modeling Framework (EMF) is one such language, which provides an EAnnotation class that can hold arbitrary data on behalf of its owning class. In one implementation using EMF, an EAnnotation has been successfully used to implement a prototype for the present invention UML keywords.

Figure 3:
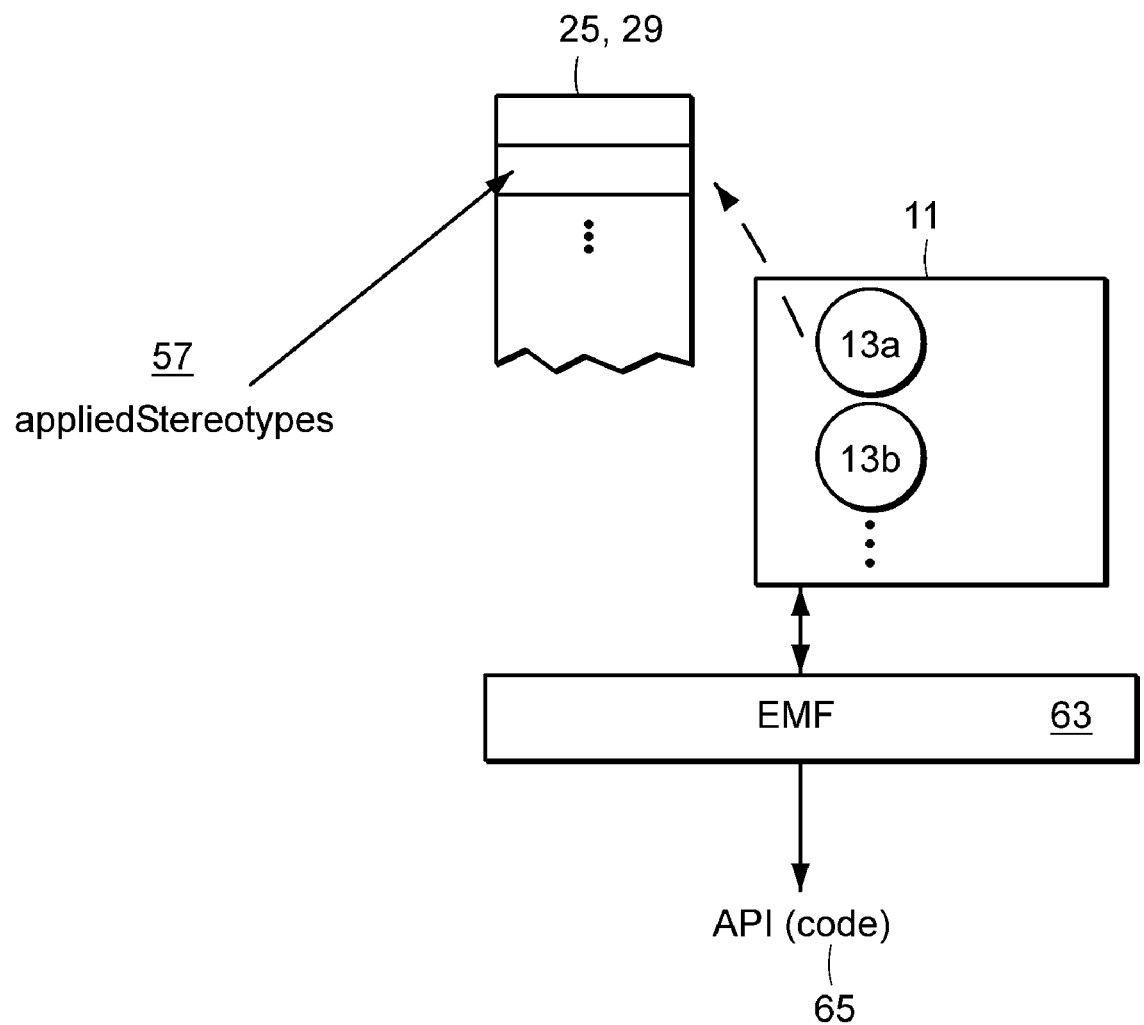

FIGS. 2 and 3 further show, in accordance with the present invention, a mechanism for creating very light stereotype-like keywords using EMF. A collection of applied stereotypes 57 is represented and/or provided by a keyword list 25. The collection of applied stereotypes 57 is effectively augmented by the addition of a list of strings 29 attached to model element 13 using an established metamodel reference (e.g., an EAnnotation in EMF). Unlike applied stereotypes 57, the keyword list 25 has an added advantage in that keywords can be modified at runtime without requiring a separate profile 17/stereotype construction phase.

In a preferred embodiment with reference to FIG. 3, model 11 is a Rose model that represents the code generation (model) of interest, i.e., the software product model being designed. Other UML or data models are suitable. The present invention records the keywords and augmenting list of strings 25, 29 in the form of annotations in respective parts of the code generation model 11. Next the preferred embodiment employs EMF 63 (or similar model interpreter) to generate Java templates or the like code 65 from the annotated Rose model 11, 25, 29. The generated Java template or the like code 65 simulates lightweight stereotypes, i.e., empty stereotypes or stereotypes used as domain-specific labels. The resulting EMF (model interpreter) 63 output is an API 65 (e.g., in an object oriented or other programming language) that correctly implements applied stereotypes 57 and in particular lightweight (or empty) stereotypes 57.

Keywords (at 25) may be used in parallel with applied stereotypes 57 and may easily be tied into the diagramming engine of a UML tool built using the UML2 API such that keywords added to the element 13 have similar notation to stereotypes (e.g. surrounded by "<< >>").

The result is a very light mechanism that simulates applying empty stereotypes to a UML element 13. Restated, the present invention effectively provides an alternative to applied profiles 19, 21 and a given modeling tool's mechanism for determining which stereotypes 15 are applied to a given element 13.

Figure 4:
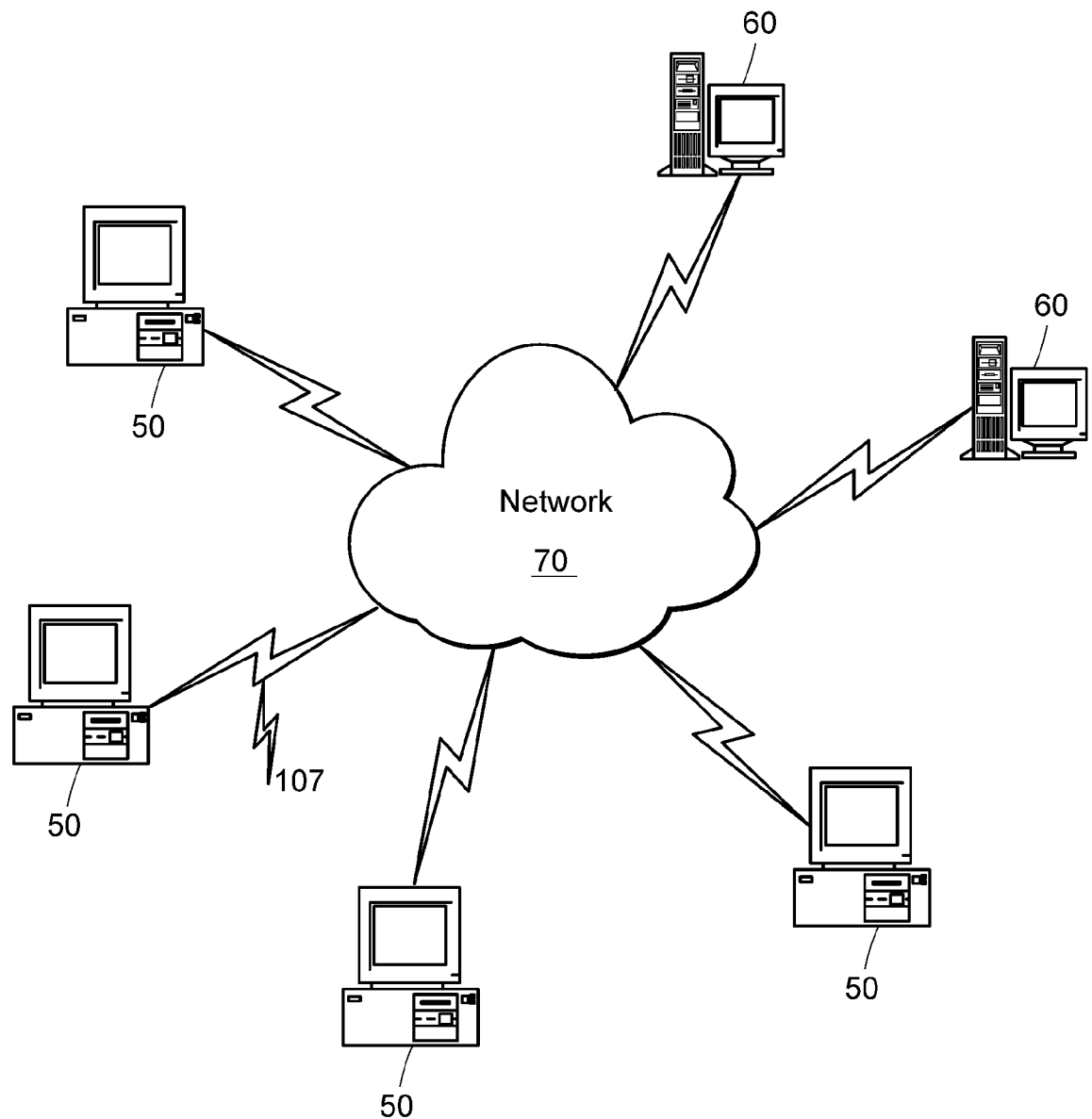
FIG. 4 is a schematic view of a computer environment in which the principles of the present invention may be implemented.

FIG. 4 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
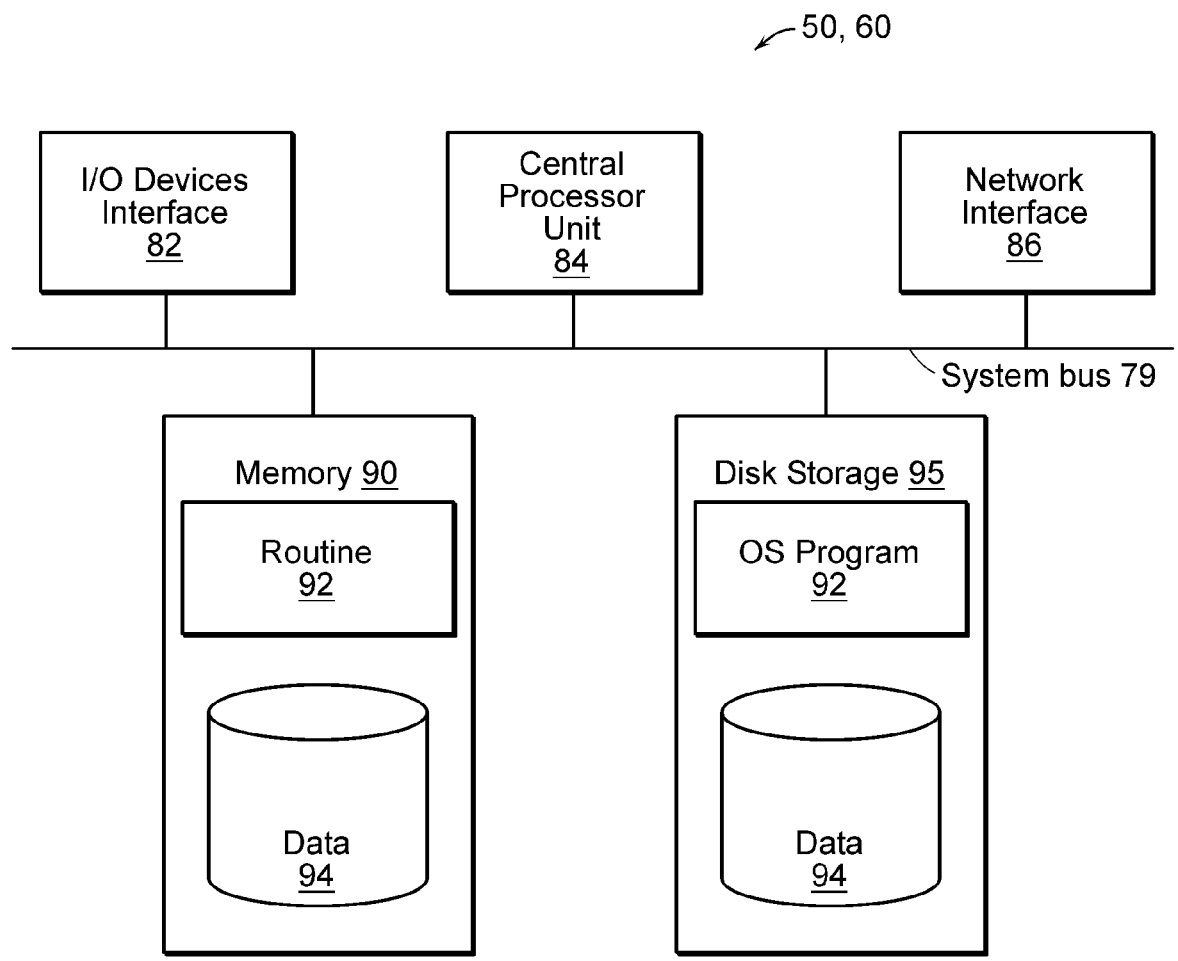
FIG. 5 is a block diagram of the internal structure of a computer from the FIG. 4 computer environment.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., annotated Rose model 11, 25, 29 and model interpreter EMF code 63 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagation medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 4 and 5 are for purposes of illustration and not limitation of the present invention.

Further the model interpreter 63 may be implemented in UML, EMF and other modeling languages. The produced API or target code 65 may be in Java, UML, EMF, XML and the like.

What is claimed is:

1. A computer method for providing modeling language stereotypes in a programming model, comprising the steps of:
   in a processor, providing lightweight steoreotypes in a subject programming model, the subject programming model being written in a modeling language that defines metaclasses and has steoreotypes that extend metaclasses using respective applied profiles, and the subject programming model being formed of a given model element having a collection of applied stereotypes, said providing lightweight steoreotypes being by:
   storing keywords indicative of the applied stereotypes, said storing being in a manner that provides correspondence between the stored keywords and the given model element and in a manner that replaces use of applied profiles of the applied stereotypes; and
   interpreting the stored keywords and generating therefrom a model in programming code that implements the applied stereotypes, the stored keywords determining which stereotypes are applied to the given model element and providing an alternative to the applied profiles.

2. The method as claimed in claim 1 wherein the applied stereotypes are empty or used as domain-specific labels.

3. The method as claimed in claim 1 wherein the step of interpreting and generating employs EMF (Eclipse Modeling Framework).

4. The method as claimed in claim 1 wherein the step of storing includes recording a keyword list as an annotation to the model element.

5. The method as claimed in claim 1 wherein the step of storing includes:
   augmenting the collection of applied stereotypes by a list of strings; and
   attaching the list of strings to the model element using a metamodel reference.

6. The method as claimed in claim 5 wherein the metamodel reference is an annotation to the model element.

7. The method as claimed in claim 1 wherein the step of storing includes removing requirement of applied profiles.

8. A computer program product for implementing modeling language stereotypes, the computer program product comprising:
   a computer useable storage medium having embodied therewith computer readable code for controlling a processor to implement lightweight stereotypes in a subject programming model, the subject programming model being written in a modeling language that defines metaclasses and has steoreotypes that extend metaclasses using respective applied profiles, and the subject programming model being formed of a model element, the processor implementing lightweight steoreotypes by carrying out the steps of:
   in response to the model element having a collection of applied stereotypes, storing keywords indicative of the applied stereotypes, said storing being in a manner that provides correspondence between the stored keywords and the model element, and in a manner that replaces use of applied profiles of the applied stereotypes; and
   interpreting the stored keywords and generating therefrom a model in programming code that implements the applied stereotypes, the stored keywords determining which stereotypes are applied to the given model element and providing an alternative to the applied profiles.

9. The computer program product as claimed in claim 8 wherein the applied stereotypes are empty or used as domain-specific labels.

10. The computer program product as claimed in claim 8 wherein the step of interpreting and generating employs EMF (Eclipse Modeling Framework).

11. The computer program product as claimed in claim 8 wherein the step of storing includes recording a keyword list as an annotation to the model element.

12. The computer program product as claimed in claim 8 wherein the step of storing includes:
   augmenting the collection of applied stereotypes by a list of strings; and
   attaching the list of strings to the model element using a metamodel reference.

13. The computer program product as claimed in claim 12 wherein the metamodel reference is an annotation to the model element.

14. The computer program product as claimed in claim 8 wherein the steps of storing and interpreting provide an alternative to applied profiles.

15. A computer system for implementing lightweight stereotypes in a target code, comprising:
   modeling means for providing a program model element written in a modeling language that defines metaclasses and has stereotypes that extend metaclasses using respective applied profiles, the program model element having one or more of applied stereotypes, the modeling means being executable by a processor;
   means for storing, in processor memory, keywords indicative of the applied stereotypes, the stored keywords determining which stereotypes are applied to the program model element, wherein the means for storing stores the keywords in a manner that provides correspondence between the stored keywords and the program model element, and in a manner that replaces use of the applied profiles of the applied stereotypes; and
   an interpreter for interpreting the stored keywords and generating target code therefrom that implements the applied stereotypes, the interpreter being executed by the processor, and said means for storing and the interpreter providing an alternative to the applied profiles.

16. The computer system as claimed in claim 15 wherein the modeling means includes a UML (Unified Modeling Language) model, and the interpreter employs EMF (Eclipse Modeling Framework).

17. The computer system as claimed in claim 15 wherein the target code is Java.

18. The computer system as claimed in claim 15 wherein the applied stereotypes are empty or used as domain-specific labels.

19. The computer system as claimed in claim 15 wherein the means for storing include annotations to the model element.

20. The computer system as claimed in claim 19 wherein the keywords include a list of strings augmenting the applied stereotypes, the list of strings being stored as an annotation to the model element.

* * * * *